United States Patent
Weber et al.

(10) Patent No.: US 8,877,366 B2
(45) Date of Patent: Nov. 4, 2014

(54) COOLING PLATE FOR LITHIUM-ION BATTERY PACK

(75) Inventors: Derek R. Weber, Rochester, NY (US); Roger Michael Brisbane, Spencerport, NY (US)

(73) Assignee: GM Global Technology Operations LLC, Detroit, MI (US)

(*) Notice: Subject to any disclaimer, the term of this patent is extended or adjusted under 35 U.S.C. 154(b) by 491 days.

(21) Appl. No.: 12/651,640

(22) Filed: Jan. 4, 2010

(65) Prior Publication Data

US 2011/0162820 A1  Jul. 7, 2011

(51) Int. Cl.
| H01M 10/50 | (2006.01) |
| H01M 10/6555 | (2014.01) |
| H01M 10/6551 | (2014.01) |
| H01M 10/052 | (2010.01) |
| H01M 10/613 | (2014.01) |
| H01M 10/058 | (2010.01) |

(52) U.S. Cl.
CPC ........ *H01M 10/052* (2013.01); *H01M 10/5055* (2013.01); *Y02E 60/122* (2013.01); *H01M 10/5046* (2013.01); *Y02T 10/7011* (2013.01); *H01M 10/5004* (2013.01); *H01M 10/058* (2013.01)
USPC ........................................................ 429/120

(58) Field of Classification Search
CPC combination set(s) only.
See application file for complete search history.

(56) References Cited

U.S. PATENT DOCUMENTS

| 2001/0031392 | A1* | 10/2001 | Ogata et al. ................. 429/99 |
| 2009/0258288 | A1* | 10/2009 | Weber et al. ................ 429/120 |
| 2009/0258289 | A1* | 10/2009 | Weber et al. ................ 429/120 |
| 2010/0143782 | A1* | 6/2010 | Kruger et al. ............... 429/120 |

FOREIGN PATENT DOCUMENTS

| CN | 101557004 A | 10/2009 |
| CN | 101557023 A | 10/2009 |

\* cited by examiner

*Primary Examiner* — Ula C Ruddock
*Assistant Examiner* — Daniel Gatewood
(74) *Attorney, Agent, or Firm* — Fraser Clemens Martin & Miller LLC; J. Douglas Miller

(57) ABSTRACT

A cooling plate for a battery pack with a plurality of battery cells is provided. The cooling plate includes a cooling fin with a substantially planar surface and a perimeter. The cooling plate includes a frame abutting the cooling fin and forming a seal with the cooling fin adjacent the perimeter of the same. The frame and the cooling fin define at least one fluid inlet, at least one fluid outlet, and a flow channel therebetween. The at least one fluid inlet and the at least one fluid outlet are disposed through the seal and are in fluid communication with the flow channel. The flow channel is disposed adjacent the perimeter and in heat transfer communication with the substantially planar surface of the cooling fin. A battery pack with the cooling plate, and a method for controlling a temperature of the battery pack, are also provided.

11 Claims, 3 Drawing Sheets

COOLING PLATE FOR LITHIUM-ION BATTERY PACK

FIELD OF THE INVENTION

The present disclosure relates to a component for a battery pack assembly and more particularly to a cooling plate for a battery pack assembly.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. A plurality of individual lithium-ion battery cells can be provided in a battery pack to provide an amount of power sufficient to operate electric vehicles.

Lithium-ion batteries are known to generate heat during operation and as a result of a charge cycle when recharging. When overheated or otherwise exposed to high-temperature environments, undesirable effects can impact the operation of lithium-ion batteries. Cooling systems are typically employed with lithium-ion battery packs to militate against the undesirable overheating conditions.

As shown in FIG. 1, a state of the art battery pack 2 includes a cooling fin 4 disposed adjacent battery cells 6 for the purpose of transferring heat therefrom. A coolant is generally caused to flow through channels 8 formed throughout the cooling fin 4 for purpose of transferring heat from the battery cells 6. Due to the presence of the channels 8 and the associated ribs on the surface of the cooling fin 4, the state of the art battery pack 2 has undesirably applied a non-uniform pressure to individual battery cells 6, which has now been found to limit the longevity of the battery pack 2. Additionally, due to the presence of the ribs on the state of the art cooling fin 4, the packaging space and volumetric efficiency of the battery pack 2 has been adversely affected.

There is a continuing need for a cooling system and method for maintaining a desired temperature of a battery pack such as a lithium-ion battery pack. Desirably, the cooling system and method provides a uniformly distributed surface pressure to the battery pack while maintaining effective heat transfer therefrom.

SUMMARY OF THE INVENTION

In concordance with the instant disclosure, a cooling system and method for maintaining a desired temperature of a battery pack such as a lithium-ion battery pack, and providing a uniformly distributed surface pressure to the battery pack while maintaining effective heat transfer therefrom, is surprisingly discovered.

In a first embodiment, a cooling plate for a battery pack with a plurality of battery cells includes a cooling fin with a substantially planar surface and a perimeter. The substantially planar surface is configured to contact a face of at least one of the battery cells of the battery pack. The cooling plate also includes a frame abutting the cooling fin and forming a seal with the cooling fin adjacent the perimeter of the cooling fin. The frame and the cooling fin define at least one fluid inlet, at least one fluid outlet, and a flow channel therebetween. The at least one fluid inlet and the at least one fluid outlet are disposed through the seal and are in fluid communication with the flow channel. The flow channel is disposed adjacent the perimeter and in heat transfer communication with the substantially planar surface of the cooling fin.

In another embodiment, a battery pack comprises a plurality of battery cells disposed in a stack, and a plurality of cooling plates disposed in the stack in heat transfer communication with the battery cells. Each cooling plate includes a cooling fin with a substantially planar surface and a perimeter. The substantially planar surface contacts a face of at least one of the battery cells. Each cooling plate also includes a frame abutting the cooling fin and forming a seal with the cooling fin adjacent the perimeter of the cooling fin. The frame and the cooling fin define at least one fluid inlet, at least one fluid outlet, and a flow channel therebetween. The at least one fluid inlet and the at least one fluid outlet are disposed through the seal and are in fluid communication with the flow channel. The flow channel is disposed adjacent the perimeter and in heat transfer communication with the substantially planar surface of the cooling fin.

In a further embodiment, a method for controlling a temperature of a battery pack having a plurality of battery cells includes the steps of: providing a cooling plate including a cooling fin with a substantially planar surface and a perimeter, and a frame abutting the cooling fin and forming a seal with the cooling fin adjacent the perimeter of the cooling fin, the frame and the cooling fin defining at least one fluid inlet, at least one fluid outlet, and a flow channel therebetween, the at least one fluid inlet and the at least one fluid outlet disposed through the seal and in fluid communication with the flow channel, the flow channel disposed adjacent the perimeter and in heat transfer communication with the substantially planar surface of the cooling fin; disposing the substantially planar surface of the cooling plate adjacent one of the battery cells, the substantially planar surface of the cooling plate contacting the one of the battery cells; supplying a fluid to the at least one fluid inlet; circulating the fluid through the flow channel of the cooling plate to exchange heat from the one of the battery cells through the cooling fin to the fluid; and exhausting the heated fluid from the cooling plate to thereby control the temperature of the battery pack.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
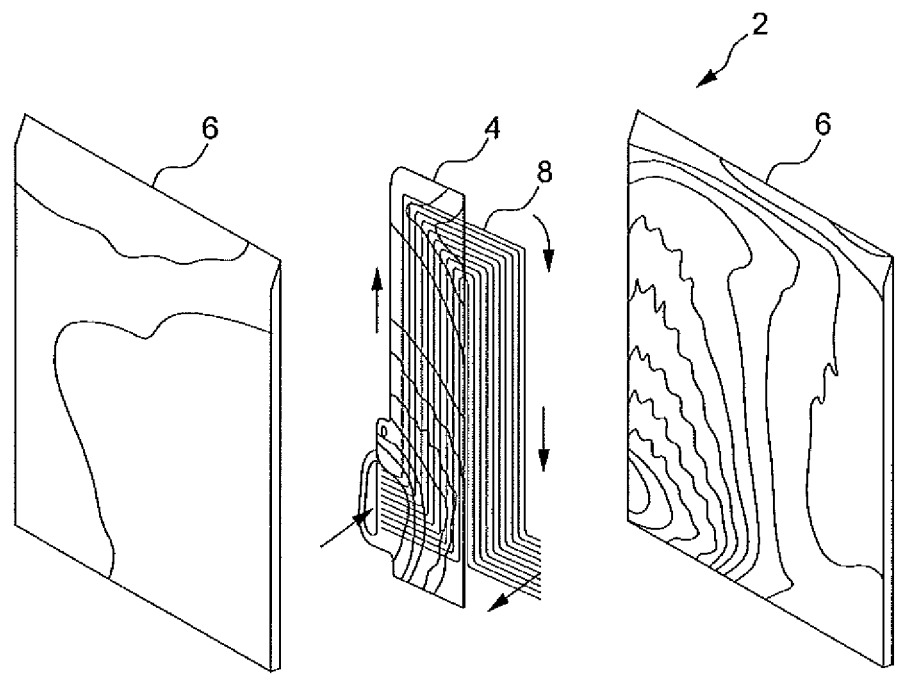
FIG. 1 is an exploded, schematic perspective view of a battery pack of the prior art, showing coolant flow through a cooling plate and temperature profiles of adjacent battery cells.
Figure 2:
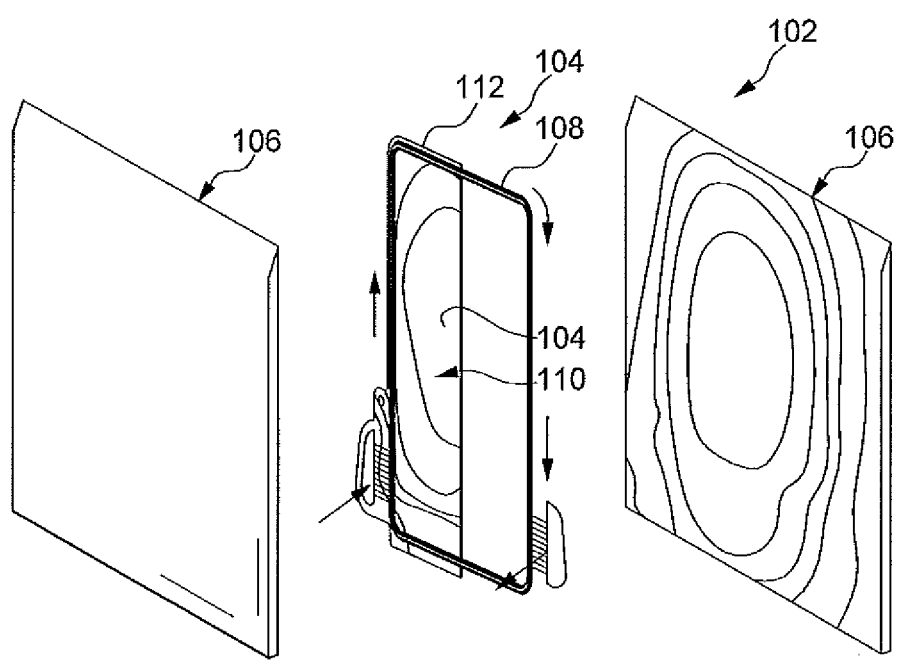
FIG. 2 is an exploded, schematic perspective view of a battery pack according to the present disclosure, showing coolant flow through a flow channel disposed adjacent a perimeter of the cooling plate.
Figure 3:
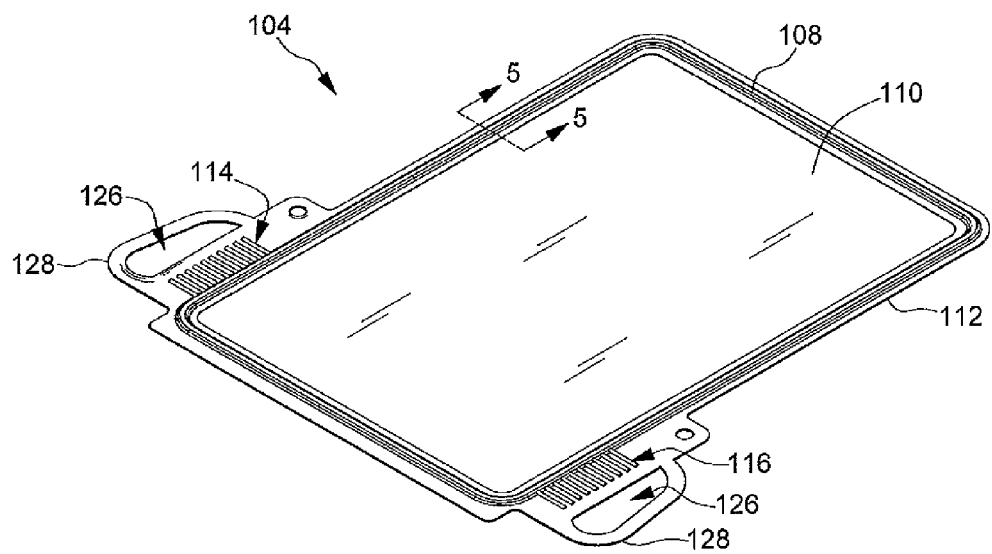
FIG. 3 is a top perspective view of a cooling plate according to one embodiment of the present disclosure.

The following detailed description and appended drawings describe and illustrate various embodiments of the invention.

The description and drawings serve to enable one skilled in the art to make and use the invention, and are not intended to limit the scope of the invention in any manner. In respect of the methods disclosed, the steps presented are exemplary in nature, and thus, are not necessary or critical.

Referring to FIGS. 2-5, a battery pack 102 according to the present invention is shown which includes a cooling plate 104 disposed adjacent and contacting a face of at least one battery cell 106. The at least one battery cell 106 is a prismatic battery cell. As a nonlimiting example, the at least one battery cell (106) may be a prismatic lithium ion (Li-ion) battery cell. It should be appreciated that other battery cells 106, employing a different structure and electrochemistry, may also be used within the scope of the present invention.

The cooling plate 104 includes a flow channel 108 and has a substantially planar surface 110. The flow channel 108 surrounds the substantially planar surface 110. The flow channel 108 is also disposed adjacent a perimeter 112 of the cooling plate 104 and in heat transfer communication with the substantially planar surface 110. Although a single flow channel 108 is shown, a plurality of the flow channels 108 disposed adjacent the perimeter 112 is also within the scope of the disclosure.

The substantially planar surface 110 is configured to contact a face of the at least one battery cell 106 of the battery pack 102. The substantially planar surface 110 is also placed in a heat exchange relationship with the at least one battery cell 106. The cooling plate 104 further has at least one fluid inlet 114 and at least one fluid outlet 116 in fluid communication with the channel 108 for transport of fluid such as a gaseous or liquid coolant. Heat transfer from the at least one battery cell 106 through the substantially planar surface 110 to the fluid flowing through the flow channel 108 may thereby be achieved. The planar surface 110 also provides a substantially uniform distribution of pressure to the at least one battery cell 106 when the battery pack 102 is placed under compression.

Figure 4:
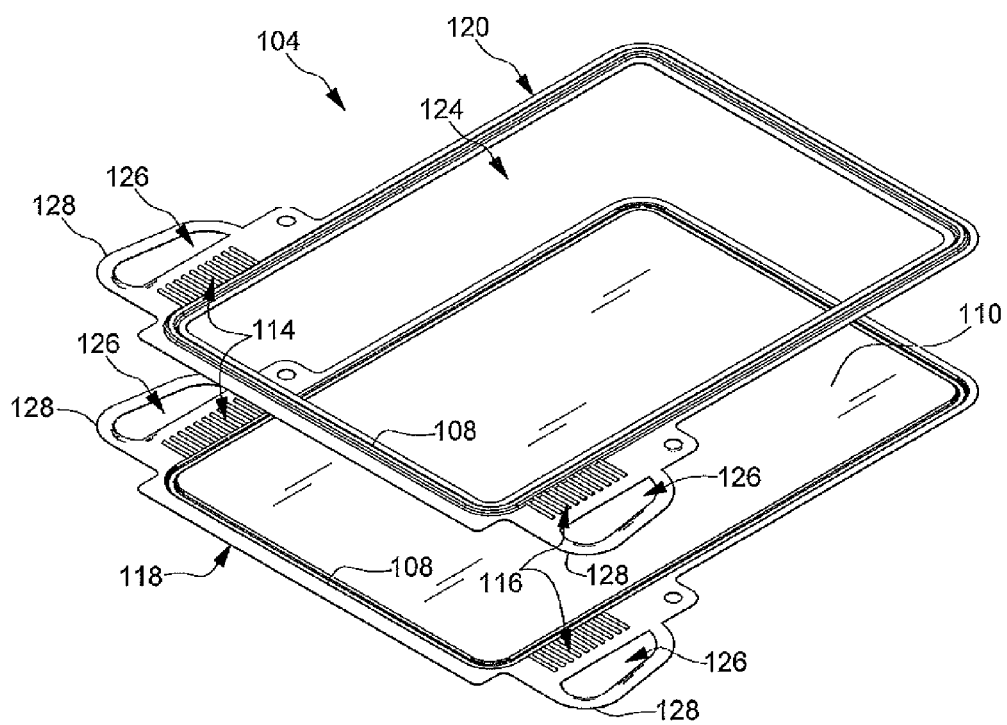
FIG. 4 is an exploded, top perspective view of the cooling plate shown in FIG. 3.
Figure 5:
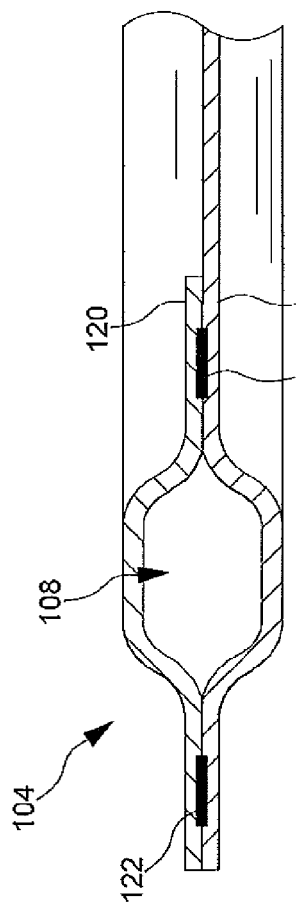
FIG. 5 is a fragmentary cross-sectional, side elevational view of the cooling plate shown in FIGS. 3 and 4, taken along section line 5-5 in FIG. 3.

As illustrated in FIGS. 4 and 5, the cooling plate 104 includes a cooling fin 118 and a frame 120. The planar surface 110 is formed on the cooling fin 118. A thickness of the cooling fin 118 at the substantially planar surface 110 is desirably minimized for improved volumetric battery pack efficiency. For example, the thickness of the cooling fin 118 at the substantially planar surface 110 may be between about 0.05 mm and about 1.0 mm. In a particularly illustrative embodiment, the cooling fin 118 has a thickness of about 0.2 mm across the entire area of the planar surface 110. One of ordinary skill in the art may select other suitable thicknesses, for example, based upon the strength and thermal conductivity of the material employed for the cooling fin 118, as desired.

The frame 118 abuts the cooling fin 120 and forms a seal 122 with the cooling fin 118 adjacent the perimeter 112 of the cooling fin 104. The frame 120 and the cooling fin 118 define the at least one fluid inlet 114, the at least one fluid outlet 116, and the flow channel 108 therebetween. For example, at least one of the cooling fin 118 and the frame 120 may have grooves or channels that cooperate with the other of the cooling fin 118 and the frame 120 to define the at least one fluid inlet 114, the at least one fluid outlet 116, and the flow channel 108. The channels may cooperate with a surface of the opposing one of the cooling fin 118 and the frame 120, for example. Where the cooling fin 118 and the frame 120 both have the channels, the cooling fin 118 and the frame 120 may be aligned so that the channels of the cooling fin 118 cooperate with the channels of the frame 120 to define the at least one fluid inlet 114, the at least one fluid outlet 116, and the flow channel 108.

The seal 122 between the cooling fin 118 and the frame 120 may be formed by one of welding and brazing the cooling fin 118 and the frame 120 together. The welded seal 122 may be formed by laser welding the cooling fin 118 and the frame 120, for example. In other embodiments, the seal 122 is formed by at least one of an elastomeric seal and an adhesive disposed between the cooling fin 118 and the frame 120. The seal 122 can also be formed by other means as desired. The seal 122 is substantially fluid-tight. The at least one fluid inlet 114 and the at least one fluid outlet 116 are disposed through the seal 122, and thereby provide a path for a flow of fluid to the flow channel 108 disposed adjacent the perimeter 112 of the cooling plate 104.

As nonlimiting examples, at least one of the cooling fin 118 and the frame 120 may be formed from aluminum, stainless steel, or coated steel. The coating on the steel is desirably a corrosion-resistant coating such as a zinc-chromate coating. In other embodiments, the steel may be galvanized to provide a desirable corrosion resistance. Other corrosion-resistant materials, coatings, and treatments suitable for use under the operating conditions of the battery pack 102 may also be employed, as desired.

In a particular embodiment, the frame 120 has an opening 124 formed in the center thereof. The opening 124 is disposed inside of the perimeter 112 of the cooling plate 104. In certain embodiments, the opening 124 may have a shape corresponding substantially to a shape of the substantially planar surface 110 of the underlying cooling fin 118. The opening 124 thereby exposes the substantially planar surface 110 of the cooling fin 118. A skilled artisan should appreciate that the opening 124 desirably minimizes a thermal mass of the cooling plate 104. In an alternative embodiment, the frame 120 may be provided without the opening 124, and with another planar surface 110 that abuts the planar surface 110 of the cooling fin 118.

At least one of the cooling fin 118 and the frame 120 may further have a pair of manifold apertures 126 formed therein. The manifold apertures 126 form a part of a manifold (not shown) when aligned in the battery pack 102 for bulk transport of the fluid to the at least one fluid inlet 114, and bulk transport of the fluid away from the at least one fluid outlet 116. In one embodiment, each of the cooling fin 118 and the frame 120 may include a pair of outwardly extending ears 128. The ears 128 may have the grooves or channels forming the at least one fluid inlet 114 and the at least one fluid outlet 116 of the cooling plate 104. The manifold apertures 126 may also be formed in the ears 128 and thereby be in fluid communication with one of the at least one fluid inlet 114 and the at least one fluid outlet 116.

Figure 6:
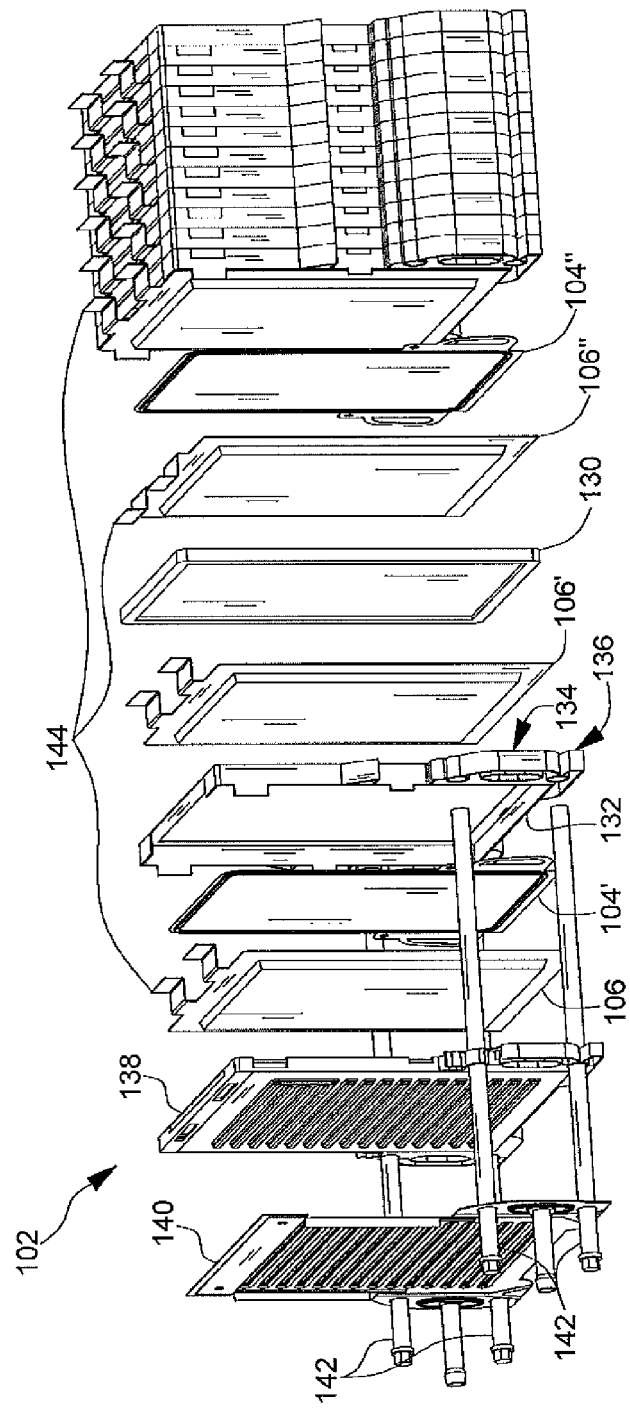
FIG. 6 is an exploded, fragmentary perspective view of a battery pack having the cooling plate according to the present disclosure.

Referring now to FIG. 6, an exemplary assembly according to the present disclosure is shown. Like or repeated structure from FIGS. 2-5 have the same reference numeral and a prime (') or a double-prime (") for purpose of clarity.

The assembled battery pack 102 may include a plurality of the cooling plates 104, 104', 104" and a plurality of the battery cells 106, 106', 106" disposed in a stack. The cooling plates 104, 104', 104" are disposed in the stack in heat transfer communication with the battery cells 106, 106', 106". For example, each one of the plurality of battery cells 106, 106', 106" may be in contact with the substantially planar surface 110 of one of the cooling plates 104, 104', 104" under compression. It should be appreciated that each of the plurality of battery cells 106, 106', 106" in contact with one of the cooling plates 104, 104', 104" thereby exhibits a substantially uniform pressure distribution across the area of the contact.

In a particular embodiment, the plurality of battery cells 106, 106', 106" includes a first battery cell 106' and a second battery cell 106". The plurality of cooling plates 104, 104', 104" includes a first cooling plate 104' and a second cooling plate 104". The battery pack 102 further includes a compliant or deformable spacer 130 disposed between the first battery cell 106' and the second battery cell 106". The spacer 130 may be conductive or nonconductive, as desired. As an illustrative example, the spacer 130 may be formed from a nonconductive foam that deforms with compression of the battery pack 102. The spacer 130 militates against an undesirable movement of the battery cells 106 during operation of the battery pack 102. Other compliant or deformable materials may also be employed for the spacer 130, as desired.

The first battery cell 106', the spacer 130, and the second battery cell 106" are sandwiched between the first cooling plate 104' and the second cooling plate 104". The first cooling plate 104' contacts the first battery cell 106', and the second cooling plate 104" contacts the second battery cell 106". It should be understood that the first cooling plate 104', the first battery cell 106', the spacer 130, and the second battery cell 106" may be so arranged to form a repeating unit of the battery pack 102.

The first cooling plate 104', the first battery cell 106', the spacer 130, and the second battery cell 106" may likewise be disposed within a repeating frame assembly 132. The repeating frame assembly 132 may be formed from plastic or rubber, for example. The repeating frame assembly 132 may be one of a plurality of repeating frame assemblies 132 in the stack including the first cooling plate 104', the first battery cell 106', the spacer 130, and the second battery cell 106" as the repeating unit of the battery pack 102. The repeating frame assemblies 132 are configured to securely hold and align the plurality of battery cells 106, 106', 106" and the plurality of cooling plates 104, 104', 104" in the stack to form the battery pack 102.

In one embodiment, the manifold apertures 126 of the cooling plates 104, 104', 104" may cooperate with similar manifold apertures 134 formed in the repeating frame assemblies 132. The manifold apertures 126 and 134 together define the supply and exhaust manifolds for the bulk transport of the fluid to and from the fluid inlets 114 and the fluid outlets 116, respectively, of the cooling plates 104, 104', 104". Like the cooling plates 104, 104', 104", the pair of manifold apertures 134 may be formed in outwardly extending ears 136 disposed on opposite sides of the repeating frame assembly 132.

The battery pack 102 according to the present disclosure may further include module end frames 138 and section end assemblies 140 disposed at ends of the stack. The module end frames 138 and the section end assemblies 140 may cooperate with compression rods 142 to hold the cooling plates 104, 104', 104" and the battery cells 106, 106', 106" under compression. Section retention loops (not shown) disposed around the stack and section covers (not shown) disposed on sides of the stack may also be employed to hold together the battery pack 102. Electrical tabs 144 in electrical communication with the battery cells 106, 106', 106" are also present for connecting the battery cells 106, 106', 106", for example, in parallel with an interconnect board (not shown). The battery pack 102 suitable for a desired application such as powering an electric vehicle may thereby be provided.

The present disclosure also includes a method for controlling a temperature of the battery pack 102 having the plurality of battery cells 106, 106', 106". The method first includes the step of providing the cooling plate 104, 104', 104" as described hereinabove. The substantially planar surface 110 of the cooling plate 104, 104', 104" is then disposed adjacent the face of one of the battery cells 106, 106', 106". The substantially planar surface 110 of the cooling plate 104, 104', 104" is caused to contact the face of one of the battery cells 106, 106', 106", for example. The fluid such as the gaseous or liquid coolant is supplied to the at least one fluid inlet 114 of the cooling plate 104, 104', 104", and circulated through the flow channel 108 of the cooling plate 104 to exchange heat from the one of the battery cells 106, 106', 106" through the cooling fin 118 to the fluid. The heated fluid is then exhausted from the cooling plate 104, 104', 104" through the at least one fluid outlet 116 to thereby control the temperature of the battery pack 102. One of ordinary skill in the art should understand that the rate of flow, the base temperature of the coolant, coolant type, and the dimensions of the flow channel 108 may be individually adjusted in order to provide the desired level of temperature control.

It is surprisingly found the planar surface 110 of the cooling plate 104, 104', 104" provides a substantially uniform pressure on the adjacent battery cell 106, 106', 106" when the battery pack 102 is compressed and assembled. The substantially uniform pressure distribution leads to greater durability and longevity of the battery pack 102 having the cooling plates 104, 104', 104" and the battery cells 106, 106', 106". The minimized thickness of the cooling fin 118 additionally improves the volumetric efficiency of the battery pack 102. It was also unexpectedly found that the flow channel 108 disposed at the perimeter 112 of the cooling plate 104, 104', 104" facilitates a sufficiently low temperature delta across the adjacent face of the battery cell 106, 106', 106". The flow channels 108 are also easily sized, for example, by stamping or similarly inexpensive manufacturing operations to customize the heat removal characteristics of the cooling plate 104, 104', 104" for a desired battery stack 102 design.

While certain representative embodiments and details have been shown for purposes of illustrating the invention, it will be apparent to those skilled in the art that various changes may be made without departing from the scope of the disclosure, which is further described in the following appended claims.

What is claimed is:

1. A cooling plate for a battery pack having a plurality of battery cells, the cooling plate comprising:
   a cooling fin;
   a frame coupled at a perimeter of the cooling fin by a first seal and a second seal, the first seal positioned outwardly of the second seal;
   a flow channel defined between the first seal and the second seal extending entirely about the perimeter of the cooling fin; and
   a planar surface of the cooling fin located entirely inward of the second seal, the flow channel completely surrounding the planar surface, the planar surface configured to directly contact a planar surface of one of the battery cells of the battery pack so the planar surface of the one of the battery cells is also positioned entirely inward of the second seal, wherein the flow channel also surrounds the battery cell without directly contacting the battery cell.

2. The cooling plate of claim 1, wherein the frame has an opening formed in a center thereof exposing the planar surface of the cooling fin.

3. The cooling plate of claim 2, wherein the battery cell extends through the opening to contact the planar surface of the cooling fin.

4. The cooling plate of claim 1, wherein one of the cooling fin and the frame includes channels that cooperate with the other of the cooling fin and the frame to define one of at least one fluid inlet and at least one fluid outlet.

5. The cooling plate of claim 1, further comprising:
at least one fluid inlet created between the cooling fin and the frame through the second seal, the at least one fluid inlet in fluid communication with the flow channel; and
at least one fluid outlet created between the cooling fin and the frame and through the second seal, the at least one fluid outlet in fluid communication with the flow channel,
wherein each of the cooling fin and the frame includes multiple channels, wherein the multiple channels of the cooling fin cooperate with the multiple channels of the frame to define one of the at least one fluid inlet and the at least one fluid outlet.

6. The cooling plate of claim 5, wherein each of the cooling fin and the frame has a pair of manifold apertures formed therein for transport of a fluid to the at least one fluid inlet and transport of the fluid away from the at least one fluid outlet.

7. The cooling plate of claim 6, wherein each of the cooling fin and the frame includes a pair of outwardly extending ears, the ears having channels forming the at least one fluid inlet and the at least one fluid outlet of the cooling plate, the manifold apertures formed in the ears and in fluid communication with one of the at least one fluid inlet and the at least one fluid outlet.

8. The cooling plate of claim 1, wherein a thickness of the cooling fin at the planar surface is between about 0.05 mm and about 1.0 mm.

9. The cooling plate of claim 1, wherein the first seal and the second seal are each formed by one of welding and brazing the cooling fin and the frame together.

10. The cooling plate of claim 1, wherein the first seal and the second seal are each formed by at least one of an elastomeric seal and an adhesive disposed between the cooling fin and the frame.

11. The cooling plate of claim 1, wherein the cooling fin and the frame are formed from a corrosion resistant material including one of aluminum, stainless steel, and a coated steel.

\* \* \* \* \*